US012244102B2

(12) United States Patent
Holub

(10) Patent No.: US 12,244,102 B2
(45) Date of Patent: Mar. 4, 2025

(54) DETACHABLE OUTER SHELL FOR A SHIELDED DEVICE CONNECTOR, AND METHOD FOR DISASSEMBLING OR ASSEMBLING THEREOF

(71) Applicant: J.S.T. CORPORATION, Farmington Hills, MI (US)

(72) Inventor: Franklin A. Holub, West Bloomfield, MI (US)

(73) Assignee: J.S.T. CORPORATION, Farmington Hills, MI (US)

( * ) Notice: Subject to any disclaimer, the term of this patent is extended or adjusted under 35 U.S.C. 154(b) by 417 days.

(21) Appl. No.: 17/749,960

(22) Filed: May 20, 2022

(65) Prior Publication Data

US 2023/0246394 A1 Aug. 3, 2023

Related U.S. Application Data

(60) Provisional application No. 63/304,517, filed on Jan. 28, 2022.

(51) Int. Cl.
*H01R 13/6581* (2011.01)
*H01R 13/502* (2006.01)
(Continued)

(52) U.S. Cl.
CPC ....... *H01R 13/6582* (2013.01); *H01R 13/502* (2013.01); *H01R 13/53* (2013.01); *H01R 13/6272* (2013.01); *H01R 13/639* (2013.01)

(58) Field of Classification Search
CPC ........................ H01R 13/6581; H01R 13/6582
See application file for complete search history.

(56) References Cited

U.S. PATENT DOCUMENTS 4,938,714 A * 7/1990 Kawai ................ H01R 13/6582 439/607.17
5,362,261 A 11/1994 Puerner
(Continued)

OTHER PUBLICATIONS

International Search Report for International Application No. PCT/US2022/030575 dated Aug. 24, 2022 (3 sheets).

*Primary Examiner* — Neil Abrams
(74) *Attorney, Agent, or Firm* — Kratz, Quintos & Hanson, LLP

(57) ABSTRACT

A detachable outer shell, which is comprised of a header connector with a shield member, for a shielded device connector. The header connector with a shield member is detachably assembled, attached, or mounted onto a housing of a shielded device connector, while the shielded device preferably remains connected to an electrical device. A method for detaching the outer shell for the shielded device connector includes the steps of detaching the header connector with the shield member of the outer shell, which may require service, repair or replacement, from the housing of the shielded device; and disassembling or removing the header connector with the shield member of the outer shell from the housing of the shielded device connector, while maintaining connection of the shielded device to the electrical device.

method for attaching the outer shell for the shielded device connector includes the steps of attaching the header connector with the shield member of the outer shell, which may been serviced, repaired, or replaced, onto the housing of the shielded device connector; and assembling, mounting, or connecting the header connector with the shield member of the outer shell back onto the housing of the shielded device connector, while maintaining the connection of the shielded device connector to the electrical device.

20 Claims, 7 Drawing Sheets

(51) Int. Cl.

| | |
|---|---|
| ***H01R 13/53*** | (2006.01) |
| ***H01R 13/627*** | (2006.01) |
| ***H01R 13/639*** | (2006.01) |
| ***H01R 13/6582*** | (2011.01) |

(56) References Cited

U.S. PATENT DOCUMENTS

| | | | | |
|---|---|---|---|---|
| 6,824,423 | B1 * | 11/2004 | Fahl | H01R 13/625<br>439/573 |
| 7,717,730 | B2 * | 5/2010 | Wu | H01R 13/6582<br>439/607.1 |
| 7,749,015 | B2 * | 7/2010 | Uchikawa | H01R 13/6395<br>439/373 |
| 8,333,613 | B2 * | 12/2012 | De Chazal | H01R 13/6581<br>439/607.01 |
| 8,956,186 | B2 * | 2/2015 | de Chazal | H01R 24/00<br>439/607.27 |
| 9,742,081 | B1 | 8/2017 | Annis | |
| 2021/0175672 | A1 | 6/2021 | Hitchcock | |
| 2023/0246391 | A1 * | 8/2023 | Holub | H01R 13/516<br>439/607.01 |

* cited by examiner

DETACHABLE OUTER SHELL FOR A SHIELDED DEVICE CONNECTOR, AND METHOD FOR DISASSEMBLING OR ASSEMBLING THEREOF

CROSS-REFERENCE TO RELATED APPLICATION

This patent application claims priority to U.S. Provisional Patent Application No. 63/304,517 filed Jan. 28, 2022, which is hereby incorporated herein by reference in its entirety.

BACKGROUND OF THE INVENTION

An outer shell, which comprises al header connector or the like) with a shield member, is used to protect a shielded device connector. The header connector, a form of an electrical connector, may hold at least one metal contact or pin spaced apart at specific spacings. The header connector is mounted onto and connected to the shielded device connector (such as, a main body containing terminals, a power assembly, a high voltage and interlock loop (HVIL) assembly, or the like), which may in turn be connected to an electrical device. To protect the shielded device connector from external damage, either due to physical impact or environmental contaminants, the shielded device connector is shielded and/or sealed with the outer shell, which is comprised of the header connector (or the like), with the shield member. During, for example, transport or some other occasion, the outer shell, which comprises the header connector with the shield member, becomes damage due, to, for example, physical impact or inability to, generally, protect the shielded device connector, it is essential that the outer shell, containing the header connector with the shield member, be serviced or replaced.

When it becomes necessary for the outer shell, containing the header connector with the shield member, to be serviced or replaced due to physical damage or due to the inability to protect (i.e., by shielding or sealing) the shielded device, it is important and essential that the outer shell, which is comprised of the header connector with the shield member, be readily and efficiently detached, disassembled, or removed from a housing of the shielded device connector (e.g., the main body containing terminals, the power assembly, the HVIL assembly, or the like). That is, it is important that a method be made available to detach, disassemble, or remove a damaged outer shell, comprised of the header connector with the shielded member, from the shielded device connector, and that such detaching, disassembling, or removing of the the damaged outer shell from the housing of the shielded device connector be easily and efficiently made. That is, it is important that the damaged outer shell of the shielded device connector be readily and efficiently detached, disassembled, or removed from the housing of the shielded device connector, and be serviced or replaced.

When the outer shell of the shielded device connector is detached, disassembled, or removed from the housing of the shielded device connector, for service or repair, it is also important that the shielded device connector remains connected to its associated or corresponding electrical device.

It is similarly important that, once detached, disassembled, or removed for replacement or service, a repaired outer shell (containing a repaired header connector with shield member) or a new outer shell (containing a new header connector with shield member) be readily and efficiently attached, assembled, or mounted back onto the shielded device connector.

When a repaired or replaced outer shell of the shielded device connector is attached, assembled, or mounted back onto the housing of the shielded device connector, it is also important that the shielded device connector remains connected to its associated or corresponding electrical device.

SUMMARY OF THE INVENTION

This invention is directed to a. detachable outer shell for a. shielded device connector, and method for disassembling or assembling thereof. The outer shell of this invention is preferably comprised of a header connector (or the like) with a shield member. The outer shell protects a shielded device connector (such as, a main body containing terminals, a power assembly, a high voltage and interlock loop (HVIL) assembly, or the like) that is connected to an electrical device. The header connector of this invention, a form of an electrical connector, may hold at least one metal contact or pin spaced apart at specific spacings. The header connector is mounted onto and connected to the shielded device connector, which in turn preferably remains connected to the associated or corresponding electrical device. The outer shell of this invention, which is comprised of the header connector (or the like) with the shield member, shields or seals the shielded device from external damage, either due to physical impact or from environmental contaminants. During, for example, transport or some other occasion, the detachable outer shell, in this invention, which comprises the header connector with the shield member, may become damaged due, to, for example, physical impact or inability to, generally, protect the shielded device connector. The detachable outer shell, containing the header connector with the shield member, of this invention is readily serviced or replaced. That is, in this invention, when it becomes necessary for the outer shell, containing the header connector with the shield member, to be serviced or replaced due to physical damage or due to the inability to protect (i.e., by shielding or sealing) the shielded device, the outer shell of this invention is readily and efficiently detached, disassembled, or removed from the housing of the shielded device connector (e.g., the main body containing terminals, the power assembly, the HVIL assembly, or the like). This invention is further directed to a method to detach, disassemble, or remove a damaged outer shell, comprised of the header connector with the shielded member, from the shielded device connector, and that such method of this invention of detaching, disassembling, or removing of the damaged outer shell from the housing of the shielded device connector is easily and efficiently made. That is, the outer shell of this invention, when damaged, is readily and efficiently detached, disassembled, or removed from the housing of the shielded device connector, and be serviced or replaced.

Furthermore, in this invention, when the outer shell in this invention of the shielded device connector is detached, disassembled, or removed from the housing of the shielded device connector, for service or repair, the shielded device connector remains connected to its associated or corresponding electrical device.

Moreover, in this invention, once detached, disassembled, or removed for replacement or service, a repaired outer shell in this invention (containing a repaired leader connector with shield member) or a new outer shell in this invention (containing a new header connector with shield member) is readily and efficiently attached, assembled, or mounted back onto the housing of the shielded device connector.

Furthermore, in this invention, when the repaired or replaced outer shell of the shielded device connector is attached, assembled, or mounted back onto the housing of the shielded device connector, the shielded device connector remains connected to its associated or corresponding electrical device,

DETAILED DESCRIPTION OF THE PREFERRED EMBODIMENTS

Figure 1:
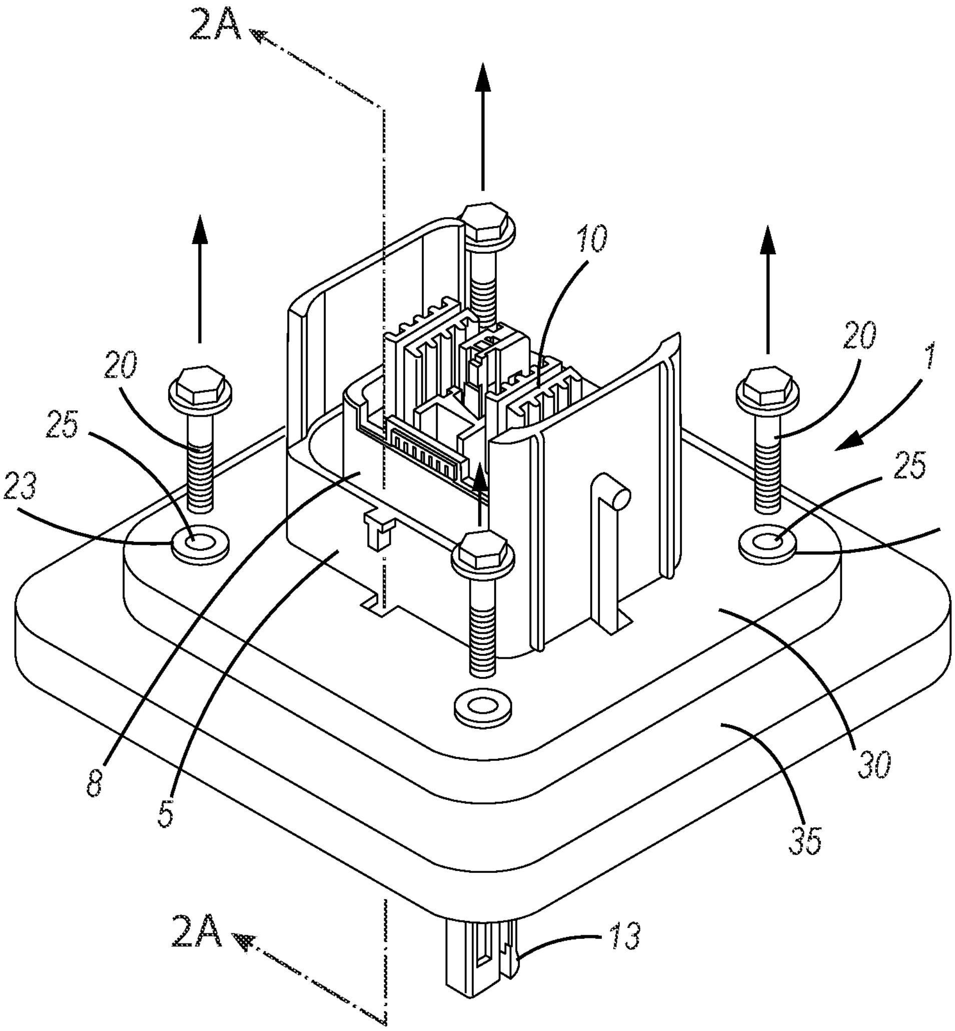
FIG. 1 is a perspective view of the detachable outer shell of this invention for the shielded device connector, the detachable outer shell being in a position to be detached, disassembled, or removed from the housing of the shielded device connector that in turn preferably remains connected to the electrical device.

FIG. 1 illustrates a detachable outer shell, generally referred to as reference number 1, of this invention. The outer shell 1 is comprised of a header connector 5 (or the like) with a shield member 8. The header connector 5 of this invention, in the form of an electrical connector, holds at least one metal contact or pin spaced apart at specific spacings (not shown). The outer shell 1 protects a shielded device connector 10 (such as, a main body containing terminals, a power assembly, a high voltage and interlock loop (HVIL) assembly, or the like) that is connected to an electrical device 13. FIG. 1 is a perspective view of the outer shell 1 of this invention for the shielded device connector 10, the outer shell 1 being detachable and in a position to be readily and efficiently detached, disassembled, or removed from a housing 18 (see FIG. 2A) of the shielded device connector 10 that in turn preferably remains connected to the electrical device 13.

The outer shell 1 of this invention, which is comprised of the header connector 5 with the shield member 8, shields or seals the shielded device connector 10 from external damage, either due to physical impact or from environmental contaminants. During, for example, transport or some other occasion, the outer shell 1 of this invention may become damaged due, to, for example, physical impact or inability to, generally, protect the shielded device connector 10, the outer shell 1 of this invention can be readily and efficiently serviced or replaced. That is, when it becomes necessary for the outer shell 1 of this invention, containing the header connector 5 with the shield member 8, to be serviced or replaced due to physical damage or due to the inability to protect (i.e., by shielding or sealing) the shielded device connector 10, the outer shell lean be readily and efficiently detached, disassembled, or removed from the housing 18 of the shielded device connector 10, while, preferably, the shielded device connector 10 remains attached to its associated or corresponding electrical device 13. As further illustrated in FIG. 1, the header connector 5 mounts onto a platform member 35 attached to the housing 18 of the shielded device connector 10, as further discussed below.

As further illustrated in FIG. 1, in the event that the header connector 5 with the shield member 8 of the outer shell 1 of this invention becomes damaged or requires servicing or repair, the damaged header connector 5 with the shield member 8 can be readily and efficiently detached, disassembled, or removed from the housing 18 of the shielded device connector 10 by unscrewing bolts 20 screwed onto the platform member 35 extending from the housing 18 of the shielded device connector 10, each of the bolts 20 passing through a corresponding one of metallic compression limiters 23, each metallic compression limiter 23 being fitted in a respective one of apertures 25 of a base member 30 of the header connector 5 of the outer shell 1.

Figure 2A:
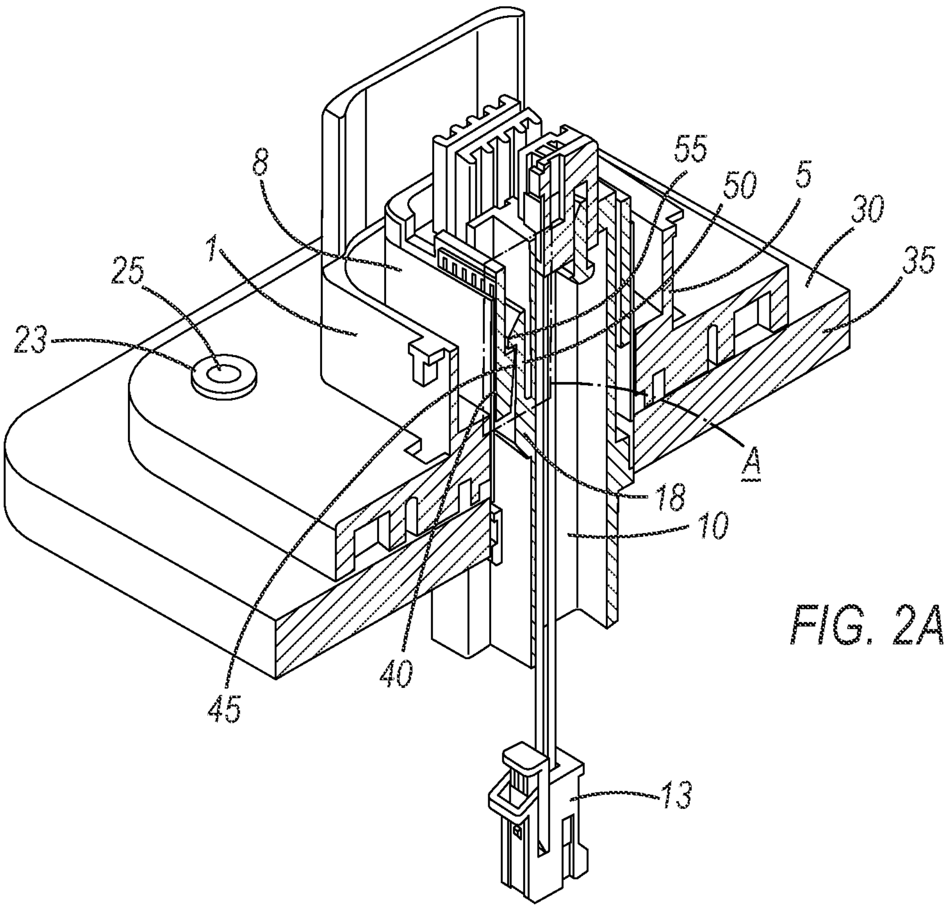
FIG. 2A is a cross-sectional view, taken along line 2A-2A of FIG. 1, showing the structural arrangement or manner for allowing the detachable outer shell of this invention to be readily and efficiently detached. disassembled, or removed from the housing of the shielded device connector that in turn preferably remains connected to the electrical device.

FIG. 2A is a cross-sectional elevational view, taken along a dashed-lined closed-up portion A shown in FIG. 2A, more particularly showing the structural arrangement or manner for allowing the detachable outer shell 1 of this invention for the shielded device connector 10 to be readily and efficiently detached, disassembled, or removed from the housing 18 of the shielded device connector 10 that preferably remains connected to the associated or corresponding electrical device 13. As more particularly shown in the dashed-lined closed-up portion A in FIG, 2A, the shield member 8 of the header connector 5 includes a latch member 40 having an engaging portion 45 extending inward of the header connector 5, while the housing 18 of the shielded device connector 10 includes another latch member 50 having an engaging portion 55 extending outward of the housing 18.

Figure 2B:
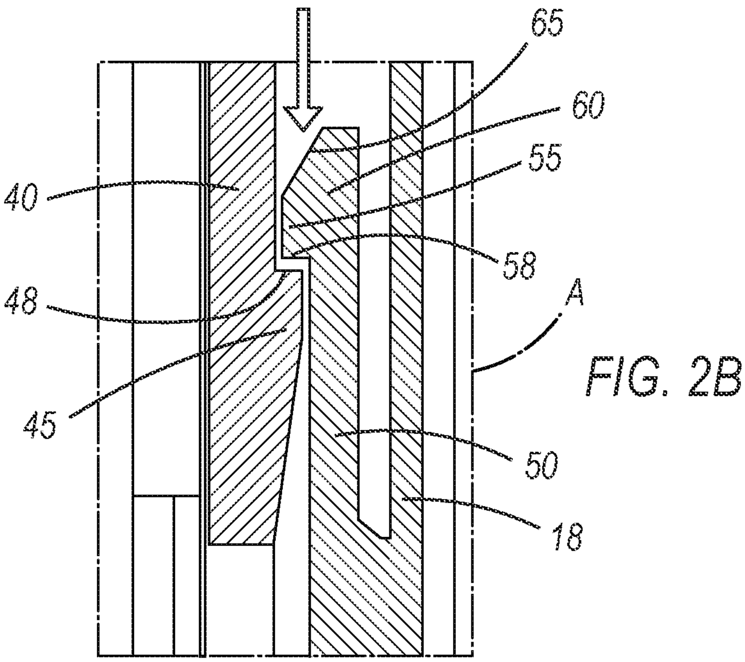
FIG. 2B is a cross-sectional elevational view, taken along a dashed-lined rectangular closed-up portion shown in FIG. 2A, more particularly showing the structural arrangement or manner for allowing the detachable outer shell of this invention to be readily and efficiently detached, disassembled, or removed from the housing of the shielded device connector that in turn preferably remains connected to the electrical device.

As more particularly illustrated in FIG. 2B, the engaging portion 45 of the latch member 40 of the shield member 8 of the header connector 5 detachably or removably engages with the engaging portion 55 of the another latch member 50 of the housing 18 of the shielded device connector 10. The latch member 40 is preferably and sturdily fixed to the shield member 8 of the header connector 5, and has a substantially flat extending portion 48. The another latch member 50 preferably extends at a distance away from the housing 18 of the shielded device connector 10, which allows the another latch member 50 to be flexible or resilient, the engaging portion 55 of the another latch member 50 being movable so that a substantially flat extending portion 58 of the engaging portion 55 of the another latch member 50 flexibly or resiliently engages with the substantially flat extending portion 48 of the latch member 40 of the shield member 8 of the header connector 5. The engaging portion 55 of the another latch member 50 has an upper portion 60 with a downwardly and outwardly inclined upper surface 65.

When the engaging portion 45 of the latch member 40 and the engaging portion 55 of the another latch member 50 are engaged to each other, as illustrated in FIG, 2B, the header connector 5 with the shield 8 of the outer shell 1 becomes engaged with the housing 18 of the shielded device connector 10, while the shielded device connector 10 preferably remains connected to the electrical device 13. When it is desired for the engaging portion 45 of the latch member 40 to become disengaged from the engaging portion 55 of the another latch member 50, a device (e.g., a screwdriver or the like) is inserted into the shield member 8 of the header connector 5 and onto the downwardly and outwardly inclined upper surface 65 of the engaging portion 55 of the latch member 50, as shown in the arrow in FIG. 2B, to allow the substantially flat extending portion 58 of the engaging portion 55 of the flexible or resilient another latch member 50 to move away or disengage from the substantially flat extending portion 48 of the engaging portion 45 of the latch member 40, which consequently disengages the engaging portion 55 away from the engaging portion 45, and subsequently allows the header connector 5 with the shield member 8 to be disassembled, removed, or disengaged from the housing 18 of the shielded device connector 10, while the shielded device connector 10 preferably remains connected to the associated electrical device 13.

The above-described disassembling, removal or disengagement of the header connector 5 with the shield member 8 away from the housing 18 of the shielded device connector 10, while the shielded device connector 10 preferably remains connected to the associated or corresponding electrical device 13, is desired when it is determined that the outer shell 1 of this invention, comprised of the header connector 5 with the shield member 8, has been damaged, due to physical impact, intrusion of environmental contaminates, or, generally, inability to protect the housing 18 or the shielded device connector 10 housed therein, or the like.

Figure 3:
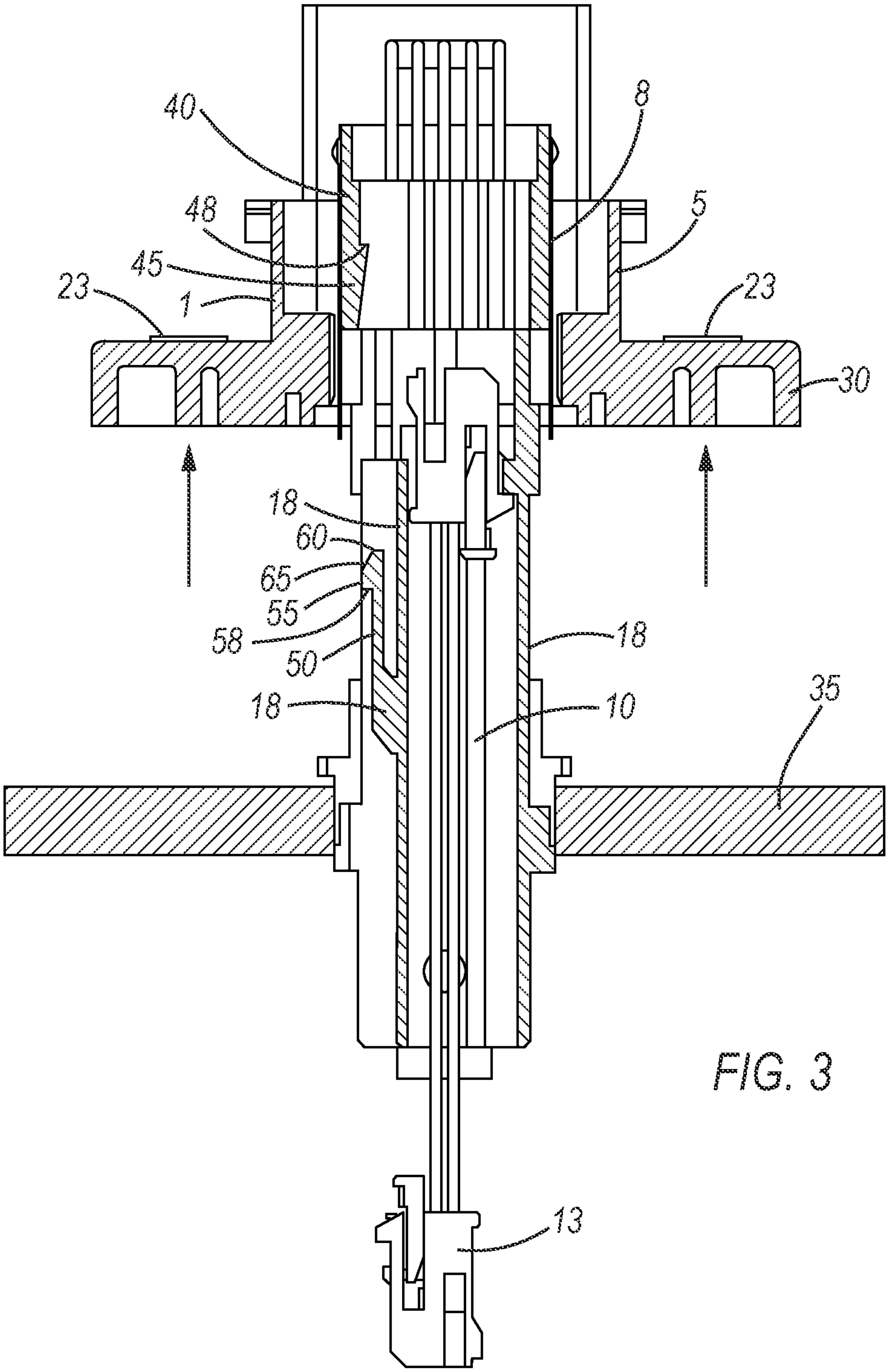
FIG. 3 is a cross-sectional elevational view showing the structural arrangement or manner in which the detachable outer shell of this invention for the shielded device connector is detached, disassembled, or removed from the housing of the shielded device connector that in turn preferably remains connected to the electrical device.

Upon the disengagement of the engaging portion 55 of the latch member 50 away from the engaging portion 45 of the latch member 40, the outer shell 1, comprising the header connector 5 with the shield member 8, is, as illustrated in FIG. 3 (see arrows), disassembled, removed, or disengaged from the housing 18 of the shielded device connector 10, while the shielded device connector 10 preferably remains connected to the associated electrical device 13. As also shown in FIG. 3, the base member 30 of the header connector 5 of the outer shell 1 is lifted (as shown in the arrows in FIG. 3) and removed from the platform member 35 attached to the housing 18 of the shielded device connector 10. Thereupon, the outer shell 1, containing therein the headed connector 5 with the shield member 8, is serviced or repaired.

Figure 4:
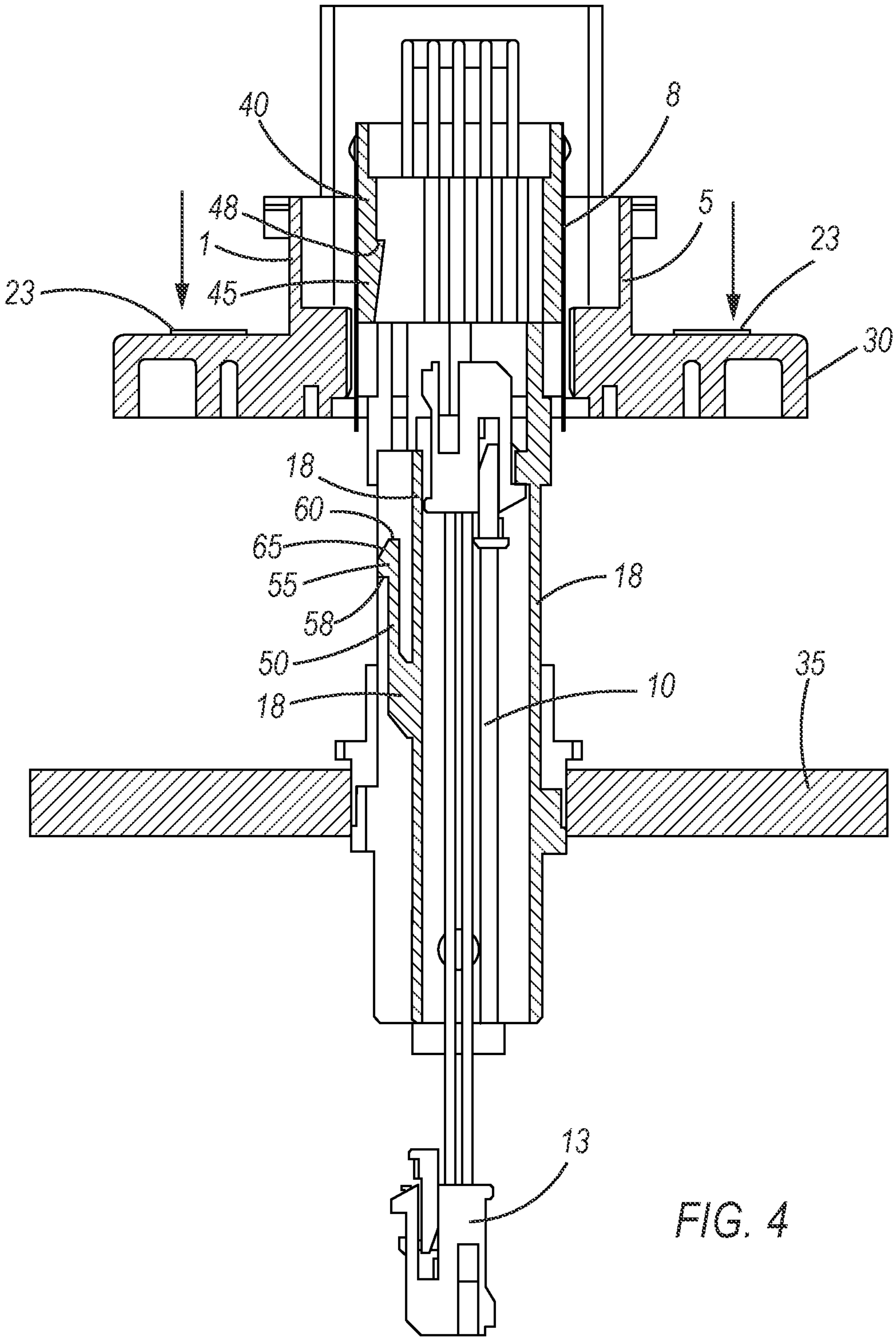
FIG. 4 is a cross-sectional elevational view showing the structural arrangement or manner in which the detachable outer shell of this invention for the shielded device connector is ready to be attached, assembled, or mounted back onto the housing of the shielded device connector that in turn preferably remains connected to the electrical device.

After the outer shell 1, containing therein the header connector 5 with the shield member 8, is serviced, repaired, or replaced, the serviced, repaired, replaced, or new outer housing shell 1, which tray similarly contain therein a serviced, repaired, replaced, or new header connector 5, also perhaps with a serviced, repaired, replaced or new shield member 8, is, as shown in FIG. 4, returned back (see the arrows in FIG. 4) for mounting onto the housing 18 of the shielded device connector 10, which preferably remains connected to the associated or corresponding electrical device 13. The serviced, repaired, replaced or new outer housing shell 1 is pushed in the direction, as shown in the arrows in FIG. 4, towards the platform member 35 attached to the housing 18 of the shielded device connector 10. Thereupon, the engaging portion 45 of the latch member 40 of the shield member 8 initially pushes inward the flexible or resilient engaging portion 55 of the latch member 55 of the housing 18 of the shielded device connector 10, while continuing to move downward, whereupon the substantially flat extending member 48 of the engaging portion 45 of the latch member 40 engages with the substantially flat extending portion 58 of the engaging portion 55 of the flexible or resilient latch member 50 (see, also, FIG. 2B), and preferably, a clicking sound is heard, which signifies that the latch members 40, 50 have fully engaged. Upon the engagement of the latch members 40, 50, the serviced, repaired, replaced, or new outer shell 1 is mounted back onto the platform member 35 attached to the housing 18 of the shielded device connector 10, as shown in FIG. 5.

Figure 5:
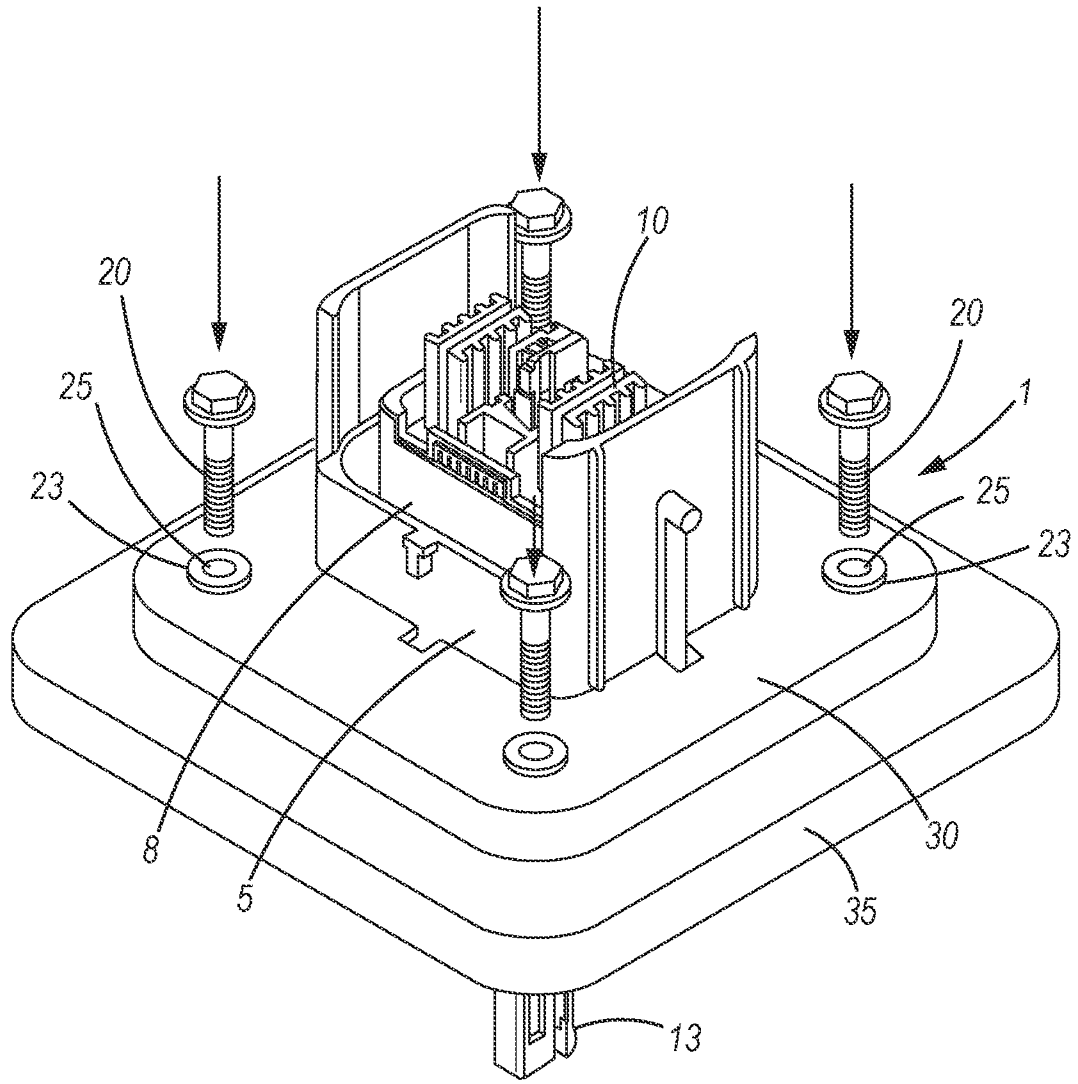
FIG. 5 is a perspective view showing the detachable outer shell of this invention for the shielded device connector being attached, assembled, or mounted back onto the housing of the shielded device connector that in turn preferably remains connected to the electrical device.

In FIG. 5, upon the return or mounting back of the services, repaired, replaced or new outer shell 1 onto the platform 35 attached to the housing 18 of the shielded device connector 10, the bolts 20 are inserted into respective ones of the metallic compression limiters 23; and thereupon, the bolts 20 are respectively screwed or attached into the platform 35 attached to the housing 18 of the shielded device connector 10, while the shielded device connector 10 remains connected to the associated or corresponding electrical device 13.

Figure 6:
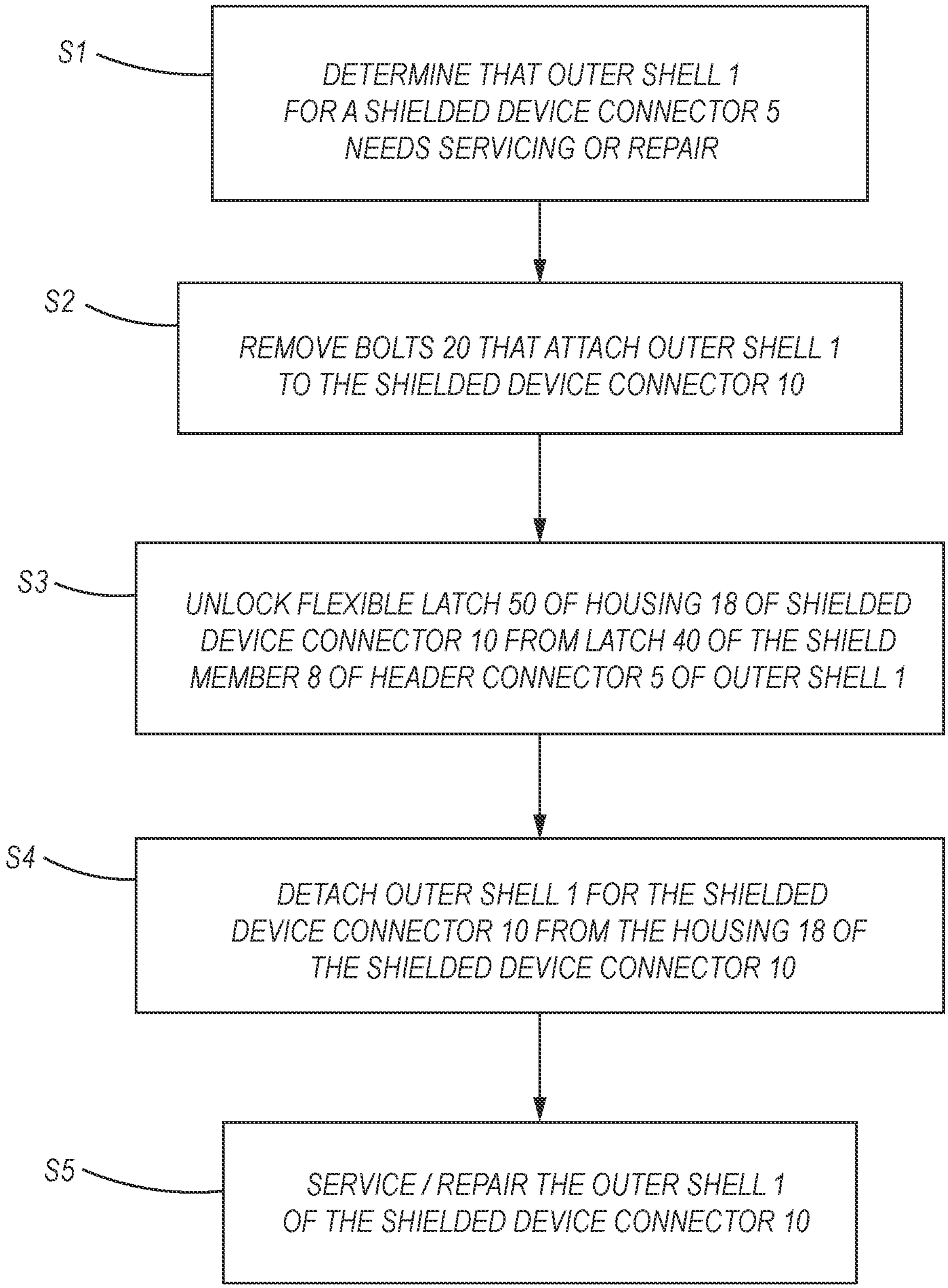
FIG. 6 is a flowchart showing the steps for detaching, disassembling, or removing the detachable outer shell of this invention for the shielded device connector from the housing of the shielded device connector that in turn preferably remains connected to the electrical device.

The method, in this invention, for disassembling the detachable outer shell 1 for the shielded device connector 10 is as shown in FIG. 6, wherein, in Step S1, it is determined that the outer shell 1 of the shielded device connector 8 requires servicing or repair. In Step S2, the bolts 20 that attach the outer shell 1 to the shielded device connector 10 are unscrewed/loosened and removed (see, also, FIG. 1). The flexible or resilient latch 50 of the housing 18 of the shielded device connector 10 is, in Step S3, unlocked from the latch 40 of the shielded member 8 of the header connector 5 of the outer shell 1 (see, also, FIGS. 2A and 2B). Thereafter, in Step S4, once the flexible latch 50 of the housing 18 of the shielded device connector 10 is unlatched or disconnected from the latch 40 of the shielded member 8 of the header connector 5, the outer shell 1 for the shielded device connector 10 is detached or removed from the housing 18 of the shielded device connector 10 (see, also, FIG. 3). The outer shell 1, which is comprised of the the header connector 5 with the shield member 8, is then serviced or repaired in Step S5.

It is preferable that the above-described. steps, Steps S1 through S5 (shown in FIG. 6), take place or occur, while the shielded device connector 10 remains connected to the associated electrical device 13.

Figure 7:
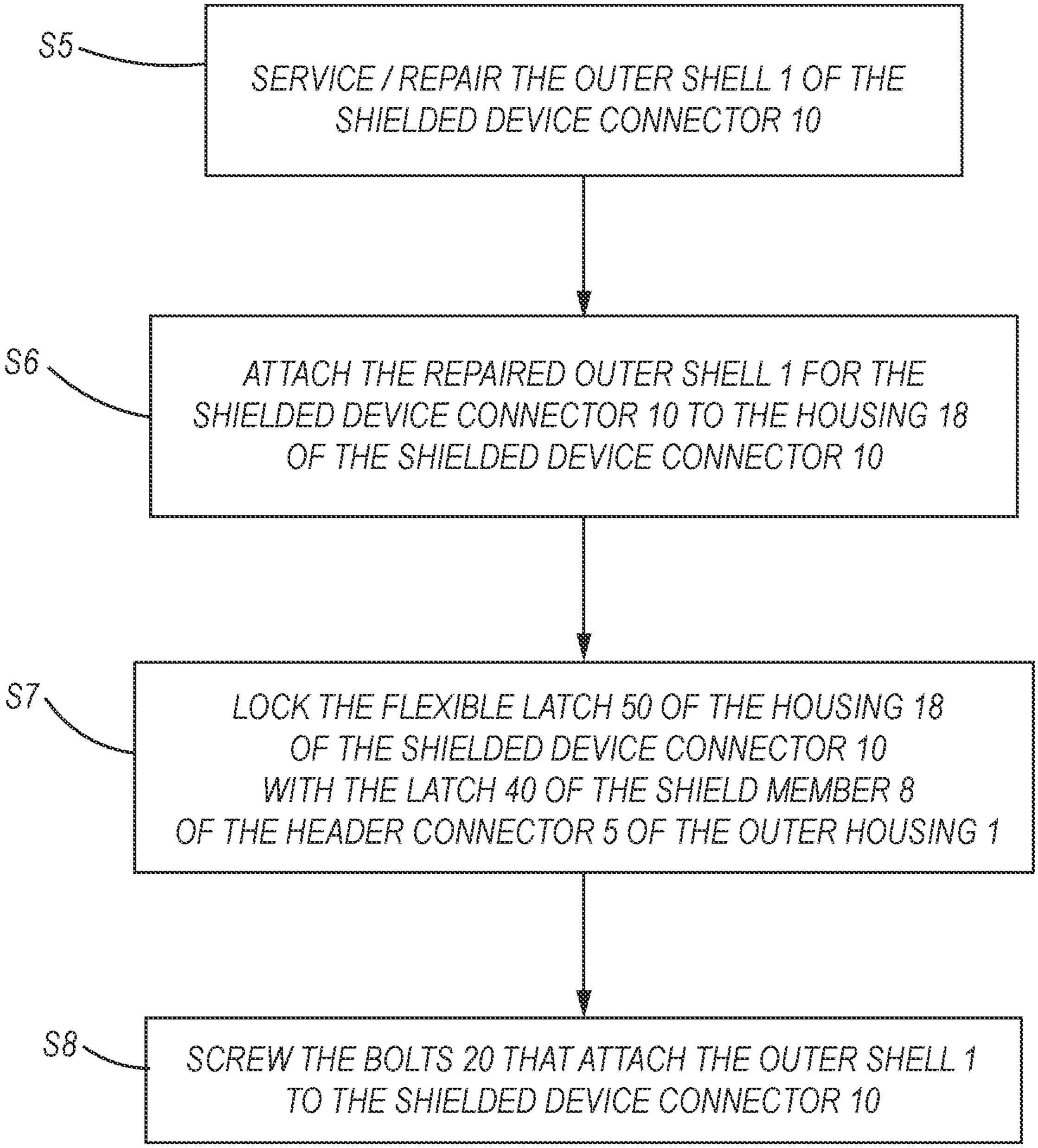
FIG. 7 is a flowchart showing the steps for attaching, assembling, or mounting back the detachable outer shell of this invention for the shielded device connector onto the housing of the shielded device connector that in turn preferably remains connected to the electrical device.

Once the outer shell 1 has been serviced, repaired, or replaced in Step S5, FIG. 7 shows the method, in this invention, for assembling back the detachable outer shell 1 for a. shielded device connector 10 onto the housing 18 of the shielded device connector 10. The serviced, repaired, replaced, or new outer shell 1 for the shielded device connector 10 is attached or mounted back onto the housing 18 of the shielded device 10, in Step S6 (see, also, FIG. 4). In Step S7, the flexible latch 50 of the housing 18 of the shielded device connector 10 is locked or latched with the latch 40 of the shield member 8 of the header connector 5 of the outer housing 1. Thereafter, in Step S8, the bolts 20 are placed and tightened into the platform member 35 attached to the housing 18 of the shielded device connector 10 so as to subsequently attach or mount the outer shell 1 back to the shielded device connector 10.

As in the above-described steps (S1 through S5) in FIG. 6, it is preferable that the above-described steps, Steps S5 through S8 (shown in FIG. 7), also take place or occur, while the shielded device connector 10 remains connected to the associated or corresponding electrical device 13.

The present invention is not limited to the above-described. embodiments; and various modifications in design, structural arrangement or the like may be used without departing from the scope or equivalents of the present invention.

I claim:

1. A detachable outer shell having a first latch for a shielded device connector, comprising a header connector with a shield member, wherein the header connector with a shield member is detachably assembled, attached, or mounted onto a housing having a second latch of a shielded device connector, and wherein the shielded device remains connected to an electrical device.

2. The detachable outer shell for the shielded device connector according to claim 1, wherein the shielded device connector is a main body containing terminals, a power assembly, or a high voltage interlock loop (HVIL) assembly.

3. The detachable outer shell for the shielded device connector according to claim 1, wherein the header connector is an electrical connector that holds at least one metal contact or pin.

4. The detachable outer shell for the shielded device connector according to claim 1, wherein the shielded device connector is connected to an electrical device.

5. The detachable outer shell for the shielded device connector according to claim 1, wherein the header connector, when requiring service, repair or replacement, is detachable or removable from the housing of the shielded device connector, while maintaining the connection of the shielded device connector to the electrical device.

6. The detachable outer shell for the shielded device connector according to claim 5, wherein the header connector, after having been serviced, repaired or replaced, is attachable, or capable of being assembled or mounted back onto the housing of the shielded device connector, while maintaining the connection of the shielded device connector to the electrical device.

7. The detachable outer shell for the shielded device connector according to claim 1, wherein the header connector with the shield member, shields or seals the shielded device connector from external damage, either due to physical impact or environmental contaminants.

8. The detachable outer shell for the shielded device connector according to claim 1 wherein the header connector with the shield member prevents damage to the shielded device connector during transport or other function thereof from physical impact or environmental contaminants.

9. The detachable outer shell for the shielded device connector according to claim 1, wherein the header connector with the shield member is readily and efficiently detached, disassembled, or removed from the housing of the shielded device connector for service, repair or replacement thereof, while maintaining the connection of the shielded device connector to the electrical device.

10. The detachable outer shell for the shielded device connector according to claim 9, wherein the header connector with the shield member is readily and efficiently attached, assembled, or mounted, after service, repair or replacement thereof, back onto the housing of the shielded device connector, while maintaining the connection of the shielded device connector to the electrical device.

11. A method for detaching an outer shell having a first latch for a shielded device connector, comprising the steps of:

detaching a header connector with said shield member of said outer shell having said first latch from a second latch of a housing of said shielded device connector;

disassembling or removing said header connector with said shield member of said outer shell from said housing of said shielded device connector; and maintaining connection of said shielded device connector to an associated or corresponding electrical device.

12. The method for detaching said outer shell for said shielded device connector according to claim 11, wherein said step of detaching said header connector with said shield member includes a step of unscrewing at least a bolt joining said header connector and said shielded device when said header connector with said shield member requires service, repair or repair, while maintaining said connection of said shielded device connector to said associated or corresponding electrical device.

13. The method for detaching said outer shell from said shielded device connector according to claim 12, wherein said step of disassembling or removing said header connector from said housing of said shielded device connector includes a step of unlatching a latch member of said housing of said shielded device connector from another latch member of said header connector, while maintaining said connection of said shielded device connector to said associated electrical device.

14. The method for detaching said outer shell from said shielded device connector according to claim 13, wherein said step of unlatching said latch member of said housing of said shielded device connector from said another latch member of said header connector includes a step of depressing or unlocking said latch member of said housing of said shielded device connector from said another latch of member said header connector, while maintaining said connection of said shielded device connector to said associated or corresponding electrical device.

15. The method for detaching said outer shell from said shielded device connector according to claim 14, wherein said step of depressing or unlocking said latch member of said housing of said shielded device from said another latch member of said header connector includes a step of dislodging, with the use of an instrument, said latch member of said housing of said shielded device connector from said another latch member of said header connector, while maintaining said connection of said shielded device connector to said associated or corresponding electrical device.

16. A method for attaching an outer shell having a first latch for a shielded device connector, comprising the steps of:

attaching a header connector with said shield member of said outer shell having said first latch onto a second latch a housing of said shielded device connector;

assembling or mounting said header connector with said shield member of said outer shell onto said housing of said shielded device connector; and maintaining connection of said shielded device connector to an associated or corresponding electrical device.

17. The method for attaching said outer shell for said shielded device connector according to claim 16, wherein said step of attaching said header connector with said shield member of said outer shell onto said housing of said shielded device connector includes a step of connecting a latch member of said header connector with another latch member of said housing of said shielded device connector, while maintaining said connection of said shielded device connector to said associated or corresponding electrical device.

18. The method for attaching said outer shell for said shielded device connector according to claim 17, wherein said step assembling or mounting said header connector with said shield member of said outer shell onto said housing of said shielded device connector includes a step of screwing at least a bolt for joining said header connector with said shield member and said housing of said shielded device connector, while maintaining said connection of said shielded device to said associated or corresponding electrical device.

19. The method for attaching said outer shell for said shielded device connector according to claim 17, wherein said step of attaching said header connector with said shield member of said outer shell onto said housing of said shielded device connector includes a step of attaching a serviced, repaired, replaced or new header connector with said shield member of said outer shell onto said housing of said shielded device connector, while maintaining said connection of said shielded device connector to said associated or corresponding electrical device.

20. The method for attaching said outer shell for said shielded device connector according to claim 18, wherein said step assembling or mounting said header connector with said shield member of said outer shell onto said housing of said shielded device connector includes a step of assembling or mounting a serviced, repaired, replaced, or new header connector with said shield member of said outer shell onto said housing of said shielded device connector, while maintaining said said connection of said shielded device connector to said associated or corresponding electrical device.

* * * * *